(12) United States Patent
Feeley et al.

(10) Patent No.: US 6,447,745 B1
(45) Date of Patent: Sep. 10, 2002

(54) CATALYTIC OXIDATION PROCESS

(75) Inventors: Jennifer Schaefer Feeley, Baton Rouge, LA (US); John Henry Dunsmuir, Flemington, NJ (US); Sebastian Carmen Reyes, Branchburg, NJ (US); Paul Joseph Berlowitz, Glen Gardner, NJ (US); John Frances Brody, Bound Brook, NJ (US); Bruce Anthony Derites, Pittstown, NJ (US); Wenyih Frank Lai, Bridgewater, NJ (US); Mark Leland Tiller, Baton Rouge, LA (US); Hyung Suk Woo, Baton Rouge, LA (US); Chuansheng Bai, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/630,280

(22) Filed: Aug. 1, 2000

(51) Int. Cl.$^7$ .................................................. C01B 3/02

(52) U.S. Cl. ................................ 423/648.1; 423/437.1; 423/651; 423/418.2; 252/373

(58) Field of Search ................ 423/418.2, 437 R, 423/651, 648.1, 579; 252/373

(56) References Cited

U.S. PATENT DOCUMENTS 5,238,613 A * 8/1993 Anderson ..................... 264/22
5,741,440 A    4/1998 Cooper ......................... 252/373

FOREIGN PATENT DOCUMENTS

RU         1780831      12/1992
WO      WO 9937580       7/1999   ............. C01B/3/40

OTHER PUBLICATIONS

Pena, M. A. et al., "Partial Oxidation of Methane to Sythesis Gas Over Ni–loaded Ultrastable HY Zeolite Catalysts", *Studies in Surface Science and Catalysis*, vol. 107, 1997, pp. 441–446, No month.

Nakagawa, K. et al., "Partial Oxidation of Methane to Synthesis Gas Over Supported Iridium Catalysts", *Applied Catalysis A: General, Elsevier Science*, Amsterdam, NL, vol. 169, No. 2, May 11, 1998, pp. 281–290.

(List continued on next page.)

Primary Examiner—Steven Bos
Assistant Examiner—Edward M. Johnson
(74) Attorney, Agent, or Firm—Jay S. Simon

(57) ABSTRACT

A process for the partial catalytic oxidation of a hydrocarbon containing feed comprising contacting the feed with an oxygen-containing gas in the presence of a catalyst retained within a reaction zone in a fixed arrangement, wherein the catalyst comprises at least one catalytically active metal selected from the group consisting of silver and Group VIII elements supported on a porous ceramic carrier. The porous ceramic carrier has a distribution of total pores wherein about 70% of the total pores (1) have a volume-to-surface area (V/S) ration that is within about 20% of the mean V/S value for the total pores and no pores have a V/S ration that is greater than twice the mean V/S value for the total pores; (2) have a pore-to-pore distance between neighboring pores that is within about 25% of the mean pore-to-pore distance between neighboring pores; and (3) have a pore throat area that is within about 50% of the mean pore throat are for the pores. Additionally, about 50% of the total pores have a coordination number between neighboring pores that is within about 25% of the mean coordination number between neighboring pores. Preferably, the oxidation process comprises a multistage, staged oxygen, catalytic partial oxidation process having fewer than or equal to about five stages and including a first stage preheat temperature of greater than about 550° C., and wherein the temperature of the product mixture in each stage following the first stage is at least about 700° C.

30 Claims, 3 Drawing Sheets

OTHER PUBLICATIONS

Matsumoto, H. et al., "Reaction Mechanism of Methane Oxidation to Synthesis Gas Over an Activated PDY Zeolite", *Journal of the Chemical Society*, Faraday Transactions, Royal Society of Chemistry, Cambridge, GB, vol. 90, No. 19, Oct. 7, 1994, pp. 3001–3006.

Hickman, D. A. et al., "Synthesis Gas Formation by Direct Oxidation of Methane Over RH Monoliths", *Catalysis Letters*, Baltzer, Scientific Publ., Basel, CH, vol. 17, No. 3/4, Feb. 1, 1993, pp. 223–237.

\* cited by examiner

CATALYTIC OXIDATION PROCESS

FIELD OF THE INVENTION

Process for the catalytic oxidation of hydrocarbons and other compounds utilizing ceramic foam supported catalysts. Included are processes for the preparation of carbon monoxide and hydrogen (certain mixtures of which are also known as synthesis gas or syngas) by catalytic partial oxidation (CPO) of low carbon number hydrocarbon feed streams, such as methane; catalytic oxidation of ethylene; catalytic oxidation of ammonia, etc. Syngas is useful for the preparation of a variety of other valuable chemical compounds, such as by application of the Fischer-Tropsch process; ethylene oxide and nitric acid also have significant commercially utility. Additionally, catalytic oxidation can be applied to processes for the reaction of hydrocarbon fuel with air and steam under conditions suitable for use in fuel cell reformer applications.

1. Background of the Invention

The combustion of methane gas at elevated temperature, e.g., 1000° F. (538° C.) is highly exothermic and produces $CO_2$ and $H_2O$ according to the following stoichiometry:

$$CH_4 + 2O_2 \rightarrow CO_2 + 2H_2O \qquad (-190.3 \text{ kcal/g mol } CH_4)$$

The gases formed in such a reaction are not directly useful for the production of valuable chemical compounds. Furthermore, if efforts were made to produce valuable products from water and carbon dioxide, the high temperatures generated would present problems with respect to reactors, catalysts and other process equipment.

Conversely, it is known to produce a chemically useful mixture of CO and $H_2$ gases, also known as synthesis gas or syngas, from methane and other light hydrocarbon gases, by various reactions, including partial oxidation, steam- or $CO_2$-reforming, or a combination of these chemistries. The partial oxidation reaction of methane is a less highly exothermic reaction which, depending upon the relative proportions of the methane and oxygen and the reaction conditions, can proceed according to the following reaction paths:

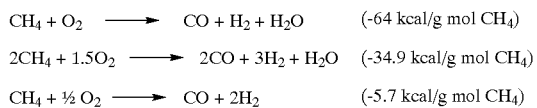

$$CH_4 + O_2 \longrightarrow CO + H_2 + H_2O \qquad (-64 \text{ kcal/g mol } CH_4)$$
$$2CH_4 + 1.5O_2 \longrightarrow 2CO + 3H_2 + H_2O \qquad (-34.9 \text{ kcal/g mol } CH_4)$$
$$CH_4 + \tfrac{1}{2}O_2 \longrightarrow CO + 2H_2 \qquad (-5.7 \text{ kcal/g mol } CH_4)$$

It is most desirable to enable the partial oxidation reaction to proceed according to the last reaction scheme. This results in certain advantages, including: (1) producing the most valuable syngas mixture; (2) minimizing the amount of heat produced (thereby protecting the apparatus and the catalyst bed); and (3) reducing the formation of steam (thereby increasing the yield of hydrogen and carbon monoxide). Any incidentally produced, or added, steam can be further converted by the steam-reforming reaction into additional useful syngas components.

Fuel cells produce electricity by converting reactants such as hydrogen and oxygen into products such as water. One method of providing hydrogen for use in a fuel cell is to oxidize a liquid hydrocarbon fuel in a fuel cell reformer that is a component of the fuel cell system. Improving the conversion of liquid hydrocarbons to hydrogen for use as a fuel in fuel cell processes is part of the continuing effort to commercialize fuel cell technology.

Ammonia oxidation is used to produce nitric acid by oxidizing ammonia in the presence of the catalyst, typically a pad of platinum-containing gauzes, to produce hot nitric oxide. The nitric oxide is then quenched and oxidized, e.g., in the presence of air, to form nitrogen (IV) oxides, which then react with water to form nitric acid. Uneven flow distribution of the ammonia through the gauze pad (i.e., the catalyst bed) can result in an undesirable reaction that produces nitrogen and water; improvements in catalyst technology could improve such a commercially important process.

The oxidation of ethylene to ethylene oxide is typically carried out in the presence of a silver-containing catalyst supported on a low surface area (<1 m²/g) alpha-alumina carrier or substrate. It has been suggested that such a substrate provides large pores that are effective in avoiding a diffusion limited reaction regime having reduced selectivity (C. N. Satterfield, "Heterogeneous Catalysis in Industrial Practice", 282, 2d Ed.,1991, McGraw-Hill). Improved catalyst technology, including improvements to the carrier or substrate per se, may thus lead to improvements in this commercially valuable process.

Copending patent application, U.S. Ser. No. 08/484378, filed Jan. 14, 2000, describes a multistage CPO process wherein control of specific process conditions, including preheat of the gaseous feedstreams and control of interstage temperature and the number of stages, leads to improved methane conversion and syngas product (hydrogen and CO) selectivity (the text of this application is incorporated herein for all permitted purposes).

A catalytic partial oxidation process utilizing a ceramic foam catalyst support is described by Vonkeman et al. in EP 576 096 B1 (Shell). The support is disclosed as having a high "tortuosity", which is defined as the ratio of the length of the path followed by a gas flowing through a bed of the catalyst to the length of the shortest straight line path through the catalyst bed. The general range of conditions disclosed for conducting a CPO process with such a catalyst includes an oxygen to carbon molar ratio in the range of from 0.45 to 0.75, elevated pressure (up to 100 bar), space velocity of from 20,000 to 25,000,000 Nl/l/hr, hydrocarbon and oxygen-containing gas, feed preheat, and a reaction zone necessarily under adiabatic conditions. The catalyst was prepared by impregnating a commercially available, particulate alpha-alumina carrier with an aqueous solution of chloroplatinic acid, followed by drying and calcining in order to deposit platinum.

Kumar et al., WO 96/16737 (Shell) also describe a specific process for the preparation of a high tortuosity ceramic foam support impregnated with high loadings of an inorganic oxide. A catalyst containing a catalytically active component is prepared with the support for use in a hydrocarbon feedstock oxidation process.

Van Grinsven, et al., EP 537 862 A1 (Shell), describe a CPO process using a noble metal catalyst supported on an alpha-alumina support having "very large pores", defined as requiring that at least 90% of the pore volume are pores greater than 2,000 nm (equivalent to 20,000 angstroms or 2 microns). Optionally the supported catalyst can be prepared using a co-impregnated salt of at least one metal which forms, upon calcination, an oxide that cannot easily be reduced ($Al_2O_3$ being most preferred).

Jacobs et al., U.S. Pat. No. 5,510,056 (Shell) disclose that successful operation of a CPO process on a commercial scale requires high conversion of the hydrocarbon feedstock at high space velocities, using mixtures of an oxygen-containing gas and methane in a preferred $O_2$ to carbon atom ratio (in the region of the stoichiometric ratio of about 1:2, or 0.5), which mixtures are preferably preheated and are at elevated pressures. The advance described in Jacobs also requires the use of a high tortuosity, high porosity catalyst carrier.

It is disclosed in EP 303 438 (assigned to Davy McKee Corp.), to conduct a CPO process using previously formed mixtures of high temperature, high pressure methane and oxygen gases and, optionally, steam at space velocities up to 500,000 hr$^{-1}$, using a mixing and distributing means in order to thoroughly premix the gases prior to introduction to the catalyst. It is the objective in this disclosure to operate the CPO process in a mass-transfer-controlled regime and to introduce the gas mixture at or above its autoignition temperature.

EP 842 894 A1 discloses a process and apparatus for catalytic partial oxidation of a hydrocarbon wherein the use of several stages is proposed. The reference states that in each stage there is used "a small fraction of the stoichiometric amount of oxygen required for the reaction" to prevent the generation of high temperatures in the reactor as a consequence of "excessive" concentrations of oxygen. Furthermore, it is disclosed that the hydrocarbon feed is mixed with oxygen and preheated to a temperature in the range of 300–400° C. and the reaction is performed at substantially the same temperature in all stages by cooling the reaction mixture in each stage.

GB Patent Application 2311790 discloses a two stage process and the use of a specifically defined catalyst whereby in a second stage a second synthesis gas is produced utilizing a first synthesis gas as feed gas, in combination with oxygen to cause partial oxidation of unreacted methane.

Staged oxygen addition has been disclosed as providing possible improvements to some of the difficulties encountered in CPO processes. "$CO_2$ Reforming and Partial Oxidation of Methane," Topics in Catalysis 3 (1996) 299–311, recommends a staged addition of $O_2$ to the reactor during methane oxidation in a two stage process, including total methane oxidation followed by reforming in the presence of the formed $CO_2$ and $H_2O$. Oxygen staging is said to lead to a flattening of the temperature profile along the reactor. However, it is also stated that "lowering the $O_2/CH_4$ ratio will make carbon deposition thermodynamically more favourable and thus lead to deactivation of the catalyst." (Id., p.308). The experimental results reported in this reference are expressed as a function of the catalyst-bed exit temperature rather than feed temperature.

The oxidation of ammonia using a reticulated ceramic foam coated with cobalt and zinc compounds is disclosed by L. E. Campbell in U.S. Pat. No. 5,336,656 (Scientific Design Company), as well as a process for preparing the catalyst. No special characteristics are attributed to the ceramic foam structure and it is merely described as commercially available and having between 10 to 100 pores per linear inch (ppi).

Several patents assigned to Dytech Corporation Limited disclose foamed ceramic catalyst supports prepared by a process which leads to articles allegedly having pores "remarkably uniform" in size (see, e.g., U.S. Pat. No. 5,563,106, at col. 4, line 42, J. G. P. Binner et al.). The reference also suggests that such porous articles can be used as catalyst supports. The ceramic foam support is prepared by introducing gas bubbles into a dispersion of fine inorganic oxide particles, optionally also including a binder, drying the wet foamed article and then sintering to obtain the final article. The reference acknowledges that the properties of the foamed ceramic can be varied widely by varying the process conditions, including the viscosity of the dispersion, the speed of stirring when introducing gas bubbles, the presence or absence of a binder and the nature of the binder, and the conditions of drying. Furthermore, it is also disclosed that articles may be produced having pores that may be open or closed. Production of foamed ceramic articles by various methods is also described by R. M. Sambrook et al. in U.S. Pat. Nos. 5,705,448; 5,772,953; and 5,922,272 (all assigned to Dytech Corporation Limited). In particular, it is suggested in the '448 patent that an interconnected open pore structure may be desired for certain applications.

Various technical articles have been published or presented relating to the preparation of ceramic foam products by various methods. The products are typically characterized by the number of pores per inch (ppi) as well as strength, thermal and density characteristics (see, e.g., "Preparation and properties of ceramic foam catalyst supports", M. V. Twigg et al., presented at the Sixth International Symposium on the Scientific Bases for the Preparation of Heterogeneous Catalysts, (Sep. 5–8, 1994); "Porous Ceramics", American Ceramic Society 71(1992) 1674–1682).

While the above references disclose certain aspects of hydrocarbon oxidation based on CPO and staged oxygen addition, there still exists a need for improvements in processes for the oxidation of hydrocarbons and other compounds, particularly related to improvements in yield and selectivity.

SUMMARY OF THE INVENTION:

A process for the catalytic oxidation of a feed comprising contacting said feed with an oxygen-containing gas in the presence of a catalyst in a reaction zone, wherein:

(a) said catalyst comprises at least one catalytically active metal selected from the group consisting of silver and the elements of Group VIII of the Periodic Table of the Elements supported on a porous ceramic carrier;

(b) said catalyst is retained within said reaction zone in a fixed arrangement; and (c) said carrier has a distribution of total pores wherein:

(1) about 70 percent of said total pores have a volume to surface area ratio (V/S) that is within about 20 percent of the mean V/S value for said total pores and no pores have a volume to surface area ratio that is greater than twice the mean V/S value for said total pores; and (2) for about 70 percent of said total pores, the pore-to-pore distance between neighboring pores is within about 25 percent of the mean pore-to-pore distance between neighboring pores; and (3) about 50 percent of said total pores have a coordination number that is within about 50 percent of the mean coordination number between neighboring pores and wherein less than about 15 percent of said total pores have a coordination number that is less than 3. Furthermore, in a preferred carrier, (4) about 70 percent of the total pores have a pore throat area that is within about 50 percent of the mean pore throat area for the total pores; preferably, about 70 percent of the total pores have a pore throat area that is within about 30 percent of the mean pore throat area for the total pores.

Preferably, the oxidation process comprises a co-fed, single stage catalytic partial oxidation (CPO) process or a multistage, staged oxygen catalytic partial oxidation process of less than or equal to about five stages and including a first stage preheat temperature of greater than about 550° C. and wherein the temperature of the product mixture in each stage following the first stage is at least about 700° C. Alternatively, the oxidation process comprises a fuel cell reformer wherein CPO and optionally, steam reforming and water-gas shift reactions are carried out using a liquid hydrocarbon fuel in order to generate hydrogen for use as the fuel in a fuel cell.

Figure 1A:
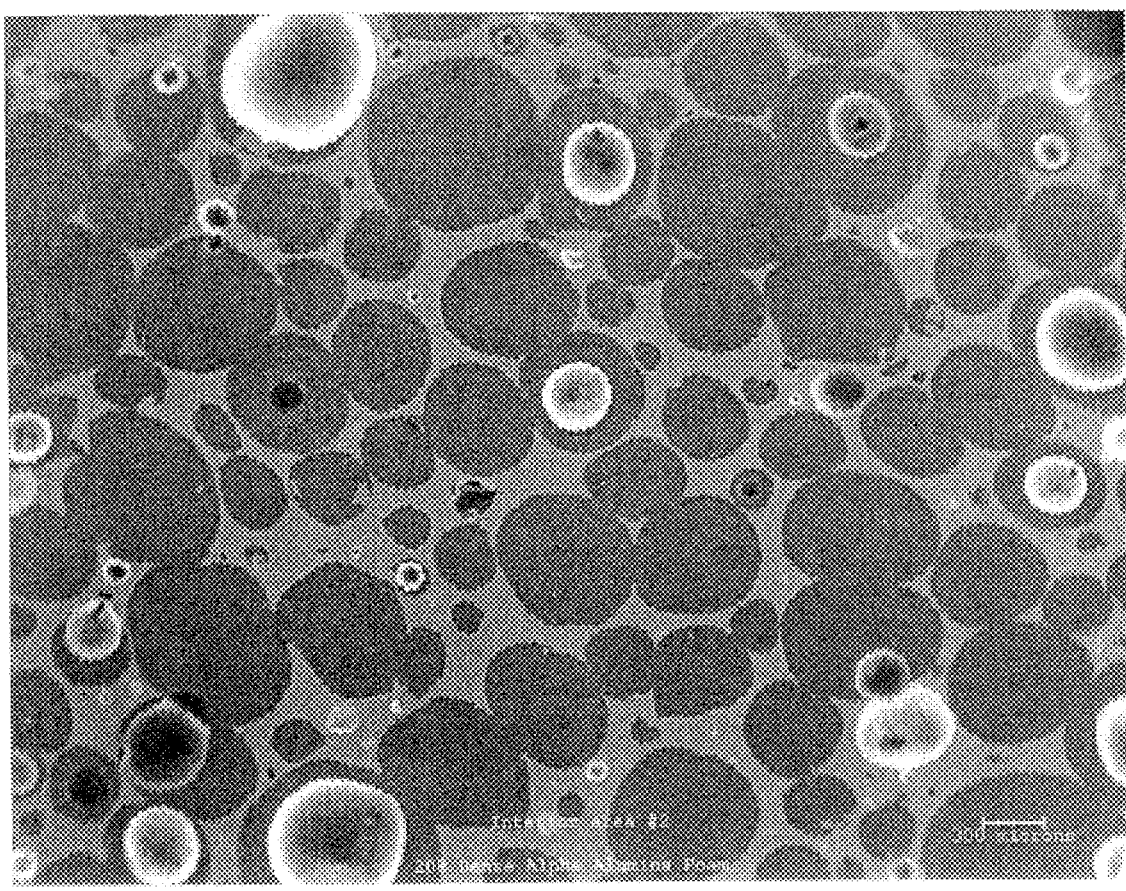
FIGS. 1A and 1B are figures prepared using scanning electron photomicrographs of sections through ceramic foam samples illustrating uniform (1A) and non-uniform (1B) pore size and spatial distributions.

DETAILED DESCRIPTION OF THE INVENTION:

Although processes in which feed gases are contacted with a particulate or monolithic catalyst retained in a fixed bed within a reactor are generally known, operation of such processes at very high gas space velocities and/or under conditions to obtain high conversions to specific products have presented continuing challenges requiring further improvements. In particular, there is a need to develop suitable technology for the catalytic partial oxidation of a hydrocarbon feedstream for the production of syngas as well as to selectively produce gaseous products having a high concentration of hydrogen. The former product, syngas, is useful as a feed material for the synthesis of commercially valuable products, such as in the Fisher-Tropsch process, and the latter as a reactant in fuel cell applications. It has now been found possible to obtain the desired products described above by conducting catalytic partial oxidation processes of various hydrocarbon feeds using catalytically active metal deposited on a catalyst support which is itself deposited on a carrier or substrate having a high degree of specifically defined structural uniformity, or microarchitecture, such as a fixed bed of a ceramic foam in the form of a monolith or particles.

Catalyst

Catalytically active metals or metal combinations suitable for use in various oxidation processes, including a syngas process for the catalytic partial oxidation of hydrocarbons, are known in the art. Preferred catalysts for use in the processes of the present invention comprise, as the catalytically active component, at least one metal selected from the group consisting of silver and Group VIII of the Periodic Table of the Elements. For purposes of the present invention, reference in this specification to the Periodic Table of the Elements means the CAS version, as published in the CRC Handbook of Chemistry and Physics, 69th Edition. Preferred catalysts for use in the claimed processes are determined by the specific oxidation process, but generally comprise at least one catalytically active metal selected from the group consisting of nickel, rhodium, palladium, osmium, iridium, platinum and silver. Catalysts comprising at least one of nickel, platinum, rhodium or iridium as the catalytically active metal is most preferred for use in the process; in particular, a catalyst comprising rhodium is preferred.

The catalytically active metal is most suitably supported on a catalyst support, which is deposited on a carrier or substrate; the resulting catalyst typically being referred to as a supported catalyst. Alternatively, the catalytically active metal can be deposited directly on a carrier or substrate (in that circumstance such carrier is also the catalyst support), particularly where the surface area of the resulting catalyst is suitable for the chemical reaction and particular process. For example, as noted above, the oxidation of ethylene is typically conducted using a relatively low surface area catalyst wherein silver or a silver-containing composition is deposited directly on alpha-alumina. Suitable starting materials for use in producing a carrier or substrate are well known in the art and include the refractory oxides such as silica, alumina, titania, zirconia and mixtures thereof. Mixed refractory oxides, that is, refractory oxides comprising at least two cations, may also be employed as carrier or substrate materials.

The carrier or substrate can be in the form of particles or a monolith. A particularly preferred structure comprises ceramic foam. Suitable ceramic foams for use in the process of the present invention are available commercially, e.g., products identified by the brand name "Dycat" are available from Dytech Corporation Limited, Sheffield, Great Britain.

A method for preparing a ceramic foam catalyst support is described in U.S. Pat. No. 5,563,106, incorporated herein by reference for all permitted purposes. The ceramic foam support is prepared by introducing gas bubbles into a dispersion of fine inorganic oxide particles, optionally also including a binder, drying the wet foamed article and then sintering to obtain the final article. The cited reference acknowledges that the properties of the foamed ceramic can be varied widely by varying the process conditions (including the viscosity of the dispersion, the speed of stirring when introducing gas bubbles, the presence or absence of a binder and the nature of the binder, and the conditions of drying) it is a specific class of such foamed ceramic products that exhibit the advantages as a catalyst carrier or substrate as taught herein. Furthermore, while it is also disclosed that conditions can be varied so that the pores in the foamed ceramic may be open or closed, closed pores are not preferred in a product intended for use as a catalyst carrier or substrate (a limited number of closed pores may contribute to, e.g., increased strength, but an excessive number will reduce the level of active metal incorporated in the interstices of the carrier or substrate that are accessible to the compound being oxidized).

In the present invention, the carrier or substrate is characterized by a uniform microarchitectural structure. Uniformity is defined by more than one distribution characteristic of the total pores within the structure. The distribution characteristics relevant to the present invention include:

1. The distribution of pore sizes. When a pore is approximately spherical, including e.g., ovoid shaped, the pore volume to surface ratio is a useful measure of pore size. For purposes of the present invention the term "pore" refers to the space or interstice in the fixed arrangement between any two adjacent portions of the carrier.

However, when the carrier or substrate is comprised of particles, a pore refers to the space between adjacent particles, i.e., an interparticle pore. In other words, in such circumstances, preferably the particles themselves have low intraparticle porosity; for example, less than about 20 $m^2/g$, more preferably in the range of about 0.5 to 10 $m^2/g$. In this manner, the active metal catalyst is concentrated at the surface of the particle rather than being less accessible within an intraparticle pore. Preferred particles have a diameter ranging from about 200–2,000 microns, more preferably about 400–1600 microns, and still more preferably about 400–1200 microns. The particles may be spherical, ovoid or other shapes which can be described or approximated by a diameter and are generally described as being granular. (Copending patent application U.S. Ser. No. 09/430,803 filed Oct. 29, 1999, discloses a catalytic partial oxidation process that utilizes a bed of particulate, supported, Group VIII metal catalyst; the text of this application is incorporated herein by reference for all permitted purposes.);

2. The uniformity of the spatial distribution of pores is defined by the uniformity of the distances between neighboring pores;

3. The distribution of pore connectivity. In the present invention, pores do not exist in isolation, but rather are connected in a substantially random arrangement to other pores by pore throats; i.e., a fluid can pass between such connected pores by passing through a passageway between connected pores that is referred to as the pore "throat". The number of other pores to which a particular pore is connected is referred to as the coordination number; and 4. The distribution of pore throat sizes. The size of a throat is characterized as the minimum cross sectional area along the connecting path between neighboring pores. The size of a pore throat is a significant parameter affecting the transport of material to and from a pore.

For purposes of the present invention, a uniform distribution of the above-identified parameters refers both to the probability of a parameter lying within a specified narrow range and to an equal probability of such a parameter lying at any spatial location within the carrier. Alternatively stated, any randomly selected sub-volume of the carrier that is sufficiently large to contain a statistically significant number of pores and throats will have statistically indistinguishable distributions of these parameters.

Pore throat and connectivity analyses are carried out as follows:

A. A gray scale is used to identify pores using images obtained by x-ray microtomography (as described hereinbelow). The three dimensional microtomographic volume images used in this analysis consist of a three dimensional array of volume elements called voxels. Each voxel is assigned a numerical value in the range between 0 and 255 which is called the graylevel. The graylevel of each voxel is directly proportional to the average x-ray linear attenuation coefficient for the material contained within the voxel. The linear attenuation coefficient is the product of the average density and the average x-ray mass attenuation coefficient of the material in the voxel. The mass density is the mass per unit volume, typically grams per cubic centimeter. The mass attenuation coefficient is related to the chemical elemental composition and generally increases with increasing atomic number. A description of linear attenuation can be found in standard works on x-ray physics (see, e.g., "Handbook of x-rays", E. F. Kaelble or "Principles and practice of x-ray spectrometric analysis", E. P. Burton).

The voxels that lie within the pores of the carrier have lower graylevel than those within the support since both the mass density and linear attenuation coefficient of the pore contents, in this case air, are much lower than those of the support which is typically mostly alumina. A plot of the number of voxels versus voxel graylevel shows that the carrier can be readily divided into two components, pore and support, by labeling all voxels with a gray level of less than 100 units as pore and the remaining voxels as support.

The volume fraction of pores is obtained by dividing the number of voxels labeled as pore by the total number of voxels. This may be done either for the entire three-dimensional volume or for any sub-volume such as a single image "slice".

B. The coordination number of a pore is determined from a three-dimensional microtomographic image in a three step computational process. First, the graylevel image is divided into two components, pore and non-pore, using the method described in "A" above. Second, the pore image is skeletonized. The skeletonization process essentially "burns" the three-dimensional pore image from the outside by changing from pore to non-pore the pore voxels that touch the non-pore component. A change that will result in breaking a connection between two pores is not allowed. The skeletonization process leaves the connected "backbone" of the three-dimensional pore structure. Third, the backbone is inspected to reveal the points where paths within the backbone meet; such points are called nodes. These nodes are by necessity within the pores of the original structure. The number of paths that meet within the pore is the coordination number for that pore. For example, a coordination number of 0 indicates an isolated pore, 1 indicates a dead end, and 3 indicates the minimum requirement for a network. A uniform distribution of the coordination number for the carrier is most preferred in order to maintain uniform transport properties within the carrier. For purposes of the present invention, about 50 percent of said total pores have a coordination number that is within about 50 percent of the mean coordination number between neighboring pores and wherein less than about 15 percent of said total pores have a coordination number that is less than 3. Preferably about 50 percent of said total pores have a coordination number that is within about 30 percent of the mean coordination number between neighboring pores and wherein less than about 10 percent of said total pores have a coordination number that is less than 3.

C. The throat size distribution is measured by examining the backbone paths. The graylevel of each voxel along the backbone is the number of outside layers removed by the skeletonization algorithm and is known as the burn number. The burn number is therefore the radius of the largest sphere that can fit within the pore space at that point. A throat size is determined by moving along the path between two nodes and identifying the minimum burn number along that path.

Throat size distribution is related to the pore size distribution since the size of the throat will be determined by the thickness of the initial material where two, typically approximately spherical, pores meet. Therefore, a preferred uniform distribution of pores, as described herein, will also lead to a uniform distribution of throat sizes. Similarly, to achieve preferred uniform transport properties within a carrier, the throat size per se is not the critical feature so much as the breadth of the distribution of throat sizes within the carrier; a narrow distribution is preferred, as is a narrow distribution of pore sizes. Quantitatively, about 70 percent of the total pores have a pore throat area that is within about 50 percent of the mean pore throat area for the total pores; preferably, about 70 percent of the total pores have a pore throat area that is within about 30 percent of the mean pore throat area for the total pores.

In summary, the carrier or substrate useful in the present invention has:

(1) about 70 percent, preferably about 80 percent, of the total pores have a volume to surface area ratio (V/S) that is within about 20 percent, of the mean V/S value for the total pores; still more preferably, about 90 percent of the total pores have a volume to surface area ratio (V/S) that is within about 10 percent of the mean V/S value for the total pores; and (2) for about 70 percent of the total pores, preferably for about 80 percent, the pore-to-pore distance between neighboring pores is within about 25 percent of the mean pore-to-pore distance between neighboring pores; more preferably, for about 90 percent of the total pores, the pore-to-pore distance between neighboring pores is within about 20 percent of the mean pore-to-pore distance between neighboring pores; and (3) about 50 percent of said total pores have a coordination number that is within about 50 percent of the mean coordination number between neighboring pores and wherein less than about 15 percent of said total pores have a coordination number that is less than 3; preferably, about 50 percent of said total pores have a coordination number that is within about 30 percent of the mean coordination number between neighboring pores and wherein less than about 10 percent of said total pores have a coordination number that is less than 3. Furthermore, (4) about 70 percent of the total pores have a pore throat area that is within about 50 percent of the mean pore throat area for the total pores; preferably, about 70 percent of the total pores have a pore throat area that is within about 30 percent of the mean pore throat area for the total pores.

Scanning electron microscopy (SEM) and x-ray microtomography (XMT) can be employed to characterize a ceramic foam carrier in order to determine whether or not it is suitable for use in the present invention. These techniques are well-known in the art and need not be described in detail herein. While the use of SEM to fully characterize a sample throughout its structure is typically destructive, XMT can be performed in a non-destructive manner to reconstruct the internal structure of a ceramic foam carrier. (A description of the XMT technique can be found in, e.g., "Image Processing Handbook", J. C. Russ, 339ff, CRC Press (1992)). It should be appreciated that in order to perform satisfactorily in the present invention, a carrier should not only have a uniform distribution of pore sizes, wherein the pore size is typically characterized by the number of pores per inch or ppi, but the pores must be uniformly distributed throughout the carrier. If uniformly sized pores are concentrated at or near the carrier surface, or at or in the center of the carrier, or if non-uniformly sized pores are uniformly distributed throughout a carrier, an unsatisfactory result will be obtained. The flow of hydrocarbon, oxygen-containing and optionally steam-containing gases (or alternatively, ethylene or ammonia) in, through and around the preferred catalytically active carrier provides an opportunity to achieve improved conversion and product selectivity under a wide variety of process operating conditions. Generally, a ceramic foam carrier will have from about 25 to about 150 ppi; preferably from about 30 to about 100 ppi.

The catalytically active metal may be deposited on the foamed ceramic substrate or carrier by techniques well known in the art. A particularly suitable technique for depositing the catalytically active metal on the carrier is impregnation, which technique typically comprises contacting the carrier with a solution, dispersion or suspension of a compound of the catalytically active metal, followed by drying and calcining the resulting material. Alternatively the catalytically active metal, for example rhodium, can be applied as part of a washcoat, for example an alumina-based washcoat, such that the catalytically active metal is supported on the washcoat and/or dispersed in the washcoat. Thus the washcoat acts as the catalyst support and the catalyst support, i.e., the washcoat is deposited on the carrier substrate. Generally, for washcoat-containing catalysts the rhodium content will be from about 2 to about 20% by weight in the washcoat; preferably from about 4 to about 12% by weight in the washcoat. Determination of the optimum rhodium loading in the washcoat is subject, in part, to an economic analysis based on the effect on performance of an increased concentration of the specific catalyst and the cost of that catalyst; such an analysis is within the abilities of those skilled in the art. The washcoat loading, expressed as grams of washcoat per cubic inch of catalyst bed, will be from about 0.1 to 2.0 g/cubic inch (0.0061 to 0.1217 g/cm$^3$); preferably from about 0.2 to about 1.0 g/cubic inch (0.0122 to 0.0609 g/cm$^3$). The use of a catalyzed washcoat as the support on the preferred carrier of the present invention is particularly preferred for use in a CPO process. In the absence of a washcoat significantly higher levels of catalyst metal may be required and performance may still be inferior to lower metal concentrations of a catalyzed washcoat. When the catalytically active metal is present in the washcoat as a particle, the average metal particle size is from greater than about 1 nanometer to less than about 50 nanometers; preferably less than about 20 nanometers; more preferably less than about 10 nanometers; for example, from about 1 to about 10 nanometers. Excessively high washcoat loadings are to be avoided, particularly where the catalyst is to be used at high space velocities, since rhodium utilization will not be optimum if there is a large diffusion limitation for reactants and products. Similarly, a thinner washcoat results in a desirably lower pressure drop through the catalyst bed.

The catalyst can also be prepared so as to include an optional catalyst modifier as part of the catalyst in addition to the at least one catalytically active metal described above. Such catalyst modifiers include a member selected from the group consisting of La, Ba, Pr and S. While not wishing to be bound by theory, it is believed that one type of modifier is an agent that stabilizes the support surface area; such materials are selected from the group consisting of the oxides of La, Ba and Pr. Other modifiers are agents that are believed to promote CO desorption from the catalyst and are selected from the group consisting of the metals of Group IB of the Periodic Table of the Elements. Further, sulfur can be used as a modifier and it is believed that it functions to inhibit the formation of rhodium oxide, which is less active than rhodium as a CPO catalyst and/or it poisons the undesirable reaction that leads to complete combustion. Modifiers of each group or all can be used individually, selectively or in combination with one another to the extent that they do not interfere with or excessively inhibit the level of conversion and/or selectivity of the intended products.

As used in the process of the present invention, the catalyst preferably is retained in form of a fixed arrangement. The fixed arrangement may comprise a fixed bed of catalyst particles. Alternatively, the fixed arrangement may comprise the catalyst in the form of a monolith structure. The fixed arrangement may consist of a single monolith or particulate structure or, alternatively, may comprise a number of separate monolith and/or particulate structures combined to form the fixed arrangement in one or more stages.

Syngas Processes

It is believed that catalytic partial oxidation (CPO) proceeds primarily by very fast metal-catalyzed steps that are only mildly exothermic. A key challenge in CPO is the need to operate at extremely high space velocities in order to suppress the contribution from non-selective gas-phase oxidation reaction pathways; this problem becomes particularly difficult to overcome at high temperatures and pressures. It is one objective of the present invention to improve the selectivity and efficiency of syngas catalytic partial oxidation processes, resulting in higher methane conversion and higher $H_2$ and CO concentrations in the syngas.

Generally CPO processes comprise contacting a feed comprising the hydrocarbon gas, an oxygen-containing gas and, optionally, steam at elevated pressure with a catalyst in a reaction zone. The catalyst typically comprises a metal selected from Group VIII of the Periodic Table supported on a carrier and the catalyst is retained within the reaction zone in a fixed arrangement. In syngas processes the hydrocarbon feed typically is one having a low boiling point; in particular, the process is suitable for the partial oxidation of methane, natural gas, or other sources of light hydrocarbons. If steam is present in the feed (as is customary in a fuel cell reformer), the steam-to-carbon ratio is preferably in the range of from above 0.0 to about 6.0, more preferably from about 0.3 to about 3.0.

In the operation of syngas CPO processes, whether or not oxygen staging is employed, it is desirable to reduce gas phase reactions to the maximum extent possible (most preferably, to eliminate such reactions) and, instead, to operate under conditions wherein all partial oxidation reactions occur on a highly active catalyst surface. In this way, the hydrocarbon feed is converted catalytically at such a high rate or low dwell time, that gas phase reactions or undesirable combustion stoichiometry (e.g., poor selectivity), do not have an opportunity to occur. Avoidance of gas phase reactions will also avoid damage to the catalyst, including physical damage as well as reduced activity and undesirable combustion reactions. More uniform carrier or substrate microarchitecture can also contribute to reduced gas phase chemistry in the catalyst bed as a consequence of more uniformly distributed void volume within the carrier. The presence of more uniformly sized pores can result in a similar improvement where there is an avoidance of excessively large pores, such that it provides greater catalytic surface area and uniform catalyst metal site density and minimizes zones where catalyst is absent, where gas phase reaction can occur. Consequently, the combination of uniform pore size and uniform pore distribution in the carrier of the present invention avoids undesirable gas phase chemistry. Uniformity of the type preferred herein is still more significant at higher operating pressures and gas velocities in order to help suppress gas phase reactions. Furthermore, CPO catalysts generally do not exhibit such high levels of steam or $CO_2$ reforming activity that would permit them to reform over-oxidized gas compositions at the high space velocities employed in syngas CPO processes.

In order to achieve reduced levels of gas phase reactions it is also necessary that the gases fed to a CPO catalyst be thoroughly premixed and the process be operated under controlled conditions. While premixing is generally important, in a staged oxygen CPO process it is especially important to provide the premixed feed under controlled preheat conditions as well as controlled interstage temperature conditions and at high space velocity in order to enable the desired catalytic reaction of the premixed gases to occur at short contact times. If the aforementioned problems are avoided or at least significantly reduced, an appropriately controlled catalytic partial oxidation process has the potential to provide extraordinary reactor productivity in view of the extremely high space velocities or throughput. Since a catalyst having high activity and selectivity is preferred under all operating conditions, a carrier having carefully designed microarchitectural structural features as described herein, is a further advantage. In stringent processes such microarchitectural structural features as are described herein are particularly advantageous.

The hydrocarbon and oxygen reaction mixture utilized in the instant invention to produce partial oxidation products need not be pure. $H_2O$ and $CO_2$, may be present in relatively large amounts in the hydrocarbon stream, such as from greater than about 0.0 to about 1.0 mole of $H_2O$ and/or $CO_2$ per carbon atom of hydrocarbon to be oxidized. Other components, for example, $H_2$, CO, Ar, $N_2$, $NH_3$, HCN, $H_2S$, COS, $CS_2$, organic sulfur-containing compounds, organic oxygenates, methane, and $C_2$+ hydrocarbons may be present in lower concentrations, typically less than 0.10 mole of the component per carbon atom of the hydrocarbon being oxidized. The stream comprising oxygen may likewise contain components other than oxygen. These components are typically $N_2$, $CO_2$, $H_2O$, and Ar. Some of these components, especially $N_2$, $CO_2$, and $H_2O$, may be present in amounts, from greater than 0.0 to about 4.0 mole per mole of oxygen ($O_2$). Other components (for example, as identified above) are typically present in amounts normally less than about 0.1 mole of such component per mole $O_2$.

Typical hydrocarbon feeds that are used in catalytic partial oxidation include methane, natural gas, individual and mixtures of light ($C_2$–$C_4$) hydrocarbons, individual and mixtures of heavier ($C_5^+$) hydrocarbons, as well as olefins, aromatics, and oxygenates. In one embodiment of the present invention, the principal component being oxidized is light hydrocarbon gas comprising methane. More typically, saturated hydrocarbons are used as feed, and the partial oxidation products comprise synthesis gas, unsaturated hydrocarbons, oxygenated hydrocarbons, and combinations thereof.

In a CPO process for producing syngas, a well-mixed reaction gas mixture comprising an oxygen-containing feed and a feed comprising one or more hydrocarbon selected from the group consisting of $C_1$–$C_4$ compounds is contacted with a fixed bed of particulate or monolithic catalyst, wherein conversion occurs at extremely high rates. When the process is operated at high pressure and at very high gas hourly space velocities, or GHSV; velocities as high as 1,000,000 hr.$^{-1}$ or more, e.g., velocities of 10,000,000 hr.$^{-1}$ or more can be encountered. For purposes of the present disclosure, GHSV is calculated as the flow rate of the gases at "standard" temperature and pressure, i.e., 1 atm/101.3 kPa and 68 ° F./20° C., divided by the total volume of the catalyst; for purposes of this definition, the total catalyst volume refers to the same aspect of the process as does GHSV, e.g., the overall process or one or more stages being considered in a multistage process. Furthermore, the use of active catalysts is preferred, among other process control variables, in order to avoid gas phase reactions. As disclosed in copending U.S. application Ser. No. 08/484378 filed Jan. 14, 2000, staged introduction of the oxygen feed during the CPO process combined with specific control of the temperature profile of the feed and in the stages, results in a more efficient process and improved selectivity, i.e., production of the desired syngas components, $H_2$ and CO in high yields. Use of the preferred catalysts described herein further contribute to improving CPO process performance.

The process of the present invention is not limited by the pressure employed in the process and may be operated at any suitable pressure, including from about one atmosphere (0.1 MPa) and higher. For certain commercial operations, elevated pressures, that is pressures significantly above atmospheric pressure, may be preferred, but the nature of the application will dictate the pressure to be utilized in the operation of the invention disclosed herein. The process may be operated at pressures in the range of up to about 50 atmospheres (about 5.0 MPa) or more. When employed in lower pressure applications, the process is operated at pressures in the range of from about 1 to about 10 atmospheres (about 0.1 to about 1.0 MPa); for example, from about 1 to about 5.0 atmospheres (about 0.1 to about 0.5 MPa). In higher-pressure applications, pressures of from greater than about 5 to about 50 atmospheres and higher (about 0.5 to about 5.0 MPa and higher) may be encountered; for example from greater than about 10 to about 30 atmospheres (about 1.0 to about 3.0 MPa).

Staged-oxygen CPO can provide higher yields and selectivities than conventional (co-fed or single-stage) CPO, provided that several specific process conditions are incorporated into the process in order to provide a workable process capable of higher yields and selectivities. However, as noted above, even so-called conventional CPO can be improved by the use of catalysts having the characteristics defined herein. As described in the copending application referred to above, it was found that the chemistry of the catalyst in a staged-oxygen CPO process becomes substantially more selective at higher temperatures, and that specific requirements for feed preheat and inter-stage temperature control must be met in order to preserve the high yields and selectivities. In particular, the reactivity behavior of the gaseous premix for intermediate stages of a staged-oxygen CPO process led to an unexpected need to carefully manage the inter-stage mixing time, and led to an unexpected preference for a limited number of stages. A description of these key features is included below as well as in the reference.

The higher yields and selectivities of a staged-oxygen CPO process were found to be significantly related to maintaining high interstage temperatures. Following the first stage, mixture temperatures between stages (i.e., the temperature at the inlet to the catalyst bed, representing the temperature of the mixed stream) should be kept above about 600° C., and more preferable above about 700° C. It is also desirable to keep such interstage mixture temperatures below about 1,000° C.; preferably interstage mixture temperatures should be from about 600° C. to about 1,000° C.; more preferably, from about 650° C. to about 950° C.; most preferably, from about 700° C. to about 900° C. Interstage cooling may be employed, but only to the extent that temperatures remain within these specified ranges. The temperatures of individual streams, e.g., initial feedstreams to the process, an intermediate oxygen-containing feedstream or an intermediate product within the process, can differ from one another and from the temperature of a mixture of one or more of such streams specified at a point in the process.

Yield of CO and $H_2$ may be diminished by low conversion (unreacted $CH_4$), or by low selectivity (e.g., production of undesirably high levels of $H_2O$ and/or $CO_2$). For the range of catalysts under consideration herein, yields improve as interstage mixture temperature rises to above about 600° C., and especially to above about 700° C. The feed mixture temperature in the first stage should be above about 450° C.; preferably above about 500° C., more preferably above about 550° C.; in each instance, the stage 1 feed mixture temperature should be less than about 1,000° C. When convenient to the overall process to provide a higher feed mixture temperature, a particularly preferred feed mixture temperature range is from about 600° C. to about 800° C.

Generally, the gaseous premix formed when the hydrocarbon stream and the oxidant stream are introduced into the mixing zone will not yet be perfectly mixed at the point of initial contact. In a real physical device, some time period or distance will be required before perfect mixing is achieved. As used herein, the term "feed stream" means the individual streams, such as hydrocarbon or oxygen-containing gas, that are being fed to the mixing zone, and the term "mixture" means the physical combination of these feed streams in a state that is highly mixed producing a "well mixed" stream. It is important that the feed streams achieve a high degree of mixing or become well mixed in a minimum amount of time, and before gas phase or catalytic reactions begin to occur at any substantial level. In order to quantify the degree of mixing, the measure "Efficiency of Mixing", designated as $E_m$, is used. $E_m$ is calculated from the composition profile of the mixture stream. Composition profiles can be obtained by sampling the stream at many locations, or by use of other diagnostic tools. For example, imaging the Rayleigh-scattered light of a laser beam can, under properly controlled conditions, provide composition variations across partially mixed streams. For the case where hydrocarbon-containing (abbreviated HC) and oxygen-containing (abbreviated OX) feed streams are being mixed, $E_m$ is defined using the following equation:

$$E_m = ((X_{HC}/X_{OX})_{MIN}/(X_{HC}/X_{OX})_{MAX})^{0.5}$$

where $X_{HC}$ and $X_{OX}$ represent mole fractions in the mixture of hydrocarbon-containing gas and oxygen-containing gas, and the subscripts "MIN" and "MAX" designate that these are the minimum and maximum ratios found in the mixture. Since the final, limited amount of oxygen is added in the last stage, it is preferred that $E_m$ in that stage be better, i.e. higher, than in earlier stages (or for the overall process) in order to avoid formation of $H_2O$ and $CO_2$. $E_m$ for the early stages of the process may be about 0.7 to about 0.8, it is preferred that $E_m$ in the last stage be greater than about 0.9. The process described herein can also be operated in a rapid injection mode, such as described in U.S. Pat. No. 5,883,138 (F. Hershkowitz et al.), the disclosure of which is incorporated herein for permitted purposes.

For purposes of the present invention, the mixing time is defined as the duration of time after addition of $O_2$ and up to the time of entry of the mixture of hydrocarbon and oxygen into, or first contact with, the catalyst. Therefore mixing time begins upon first contact of $O_2$ with the flowing stream (either the initial hydrocarbon feed or the product stream from a prior stage) and ends when the mixed stream enters the catalyst. Since mixing requires a finite time, for the purposes of the present invention such mixing time in stages after the first stage should be less than about 1.0 millisecond; preferably less than about 0.5 millisecond; more preferably less than about 0.2 millisecond; for example, from greater than zero to about 0.1 millisecond. Under practical operating conditions, a range of from about 0.05 to about 0.5 milliseconds is useful; particularly 0.05 to about 0.2 milliseconds; for example, about 0.1 milliseconds. The achievement of such short mixing times, and mixing times of even less than about 0.1 milliseconds, may be achieved by use of injector technology such as described in U.S. Pat. No. 5,883,138. Longer mixing times may be employed for the first-stage feed since it is generally less reactive (no hydrogen is present) and which may be at lower temperature. Finite mixing times of less than about 10 milliseconds should be utilized for the first stage feed; preferably, from about 0.05 milliseconds to about 5 milliseconds; more preferably from about 0.10 to about 2 milliseconds; generally, mixing times in the first stage of about 5 milliseconds or less are useful.

It is a further requirement for a staged-$O_2$ CPO process to use a moderate number of stages. In a staged-oxygen CPO process, it is also important for the gas mixture (in the first stage, the oxygen-containing feedstream and hydrocarbon, e.g., methane, and in later stages, also including the syngas and intermediate reaction products produced in prior stages) to contact the catalyst as a well mixed stream. If a well mixed stream is not achieved, $O_2$-rich zones will exist leading to high temperature regions with concurrent poorer selectivity. To accomplish rapid mixing as well as thorough mixing requires substantial cross-stream or intra-stream dispersion. Where interstage mixing time is e.g., 0.1 millisecond, then gas flow even at a speed as high as sonic velocity (e.g., about 331 m/s in air at 0° C. and ambient pressure) can be afforded a mixing distance only in the range of centimeters. Thus, mixing energy must come from the momentum of the streams being mixed. The momentum of a stream is defined as the product of the velocity of the stream as it is injected into the mixing zone of the stage (the region preceding the catalyst) multiplied by the stream's mass flow rate. As the number of stages in the staged-$O_2$ CPO process is increased, the amount of oxygen introduced (and, consequently, its mass flow rate) at any one stage is thereby diminished. Thus, for systems with many stages, the volume ratio of the oxygen-containing stream to the continuing fuel stream will be very low. Therefore, the use of an excessive number of stages, each having very low volume ratios of oxygen to fuel (or hydrocarbon) in the gaseous stream, is an impediment to required rapid and thorough mixing, particularly as a consequence of diminished momentum of each oxygen stream. The momentum of an oxygen stream in a stage in which a relatively low mass flow rate of oxygen is being used can be increased by mixing the oxygen with a quantity of at least one gas that is inert or substantially inert under the process conditions taught herein, e.g., nitrogen and steam. However, introduction of a significant volume of inert gas requires an increase in the size of equipment for gas handling, and, possibly, gas recycling. Without undue experimentation, one skilled in the art can determine a practical or economic balance between increased momentum and the increased burden on process equipment and operations.

A useful parameter in defining the preferred number of stages is the Oxygen to Fuel-Carbon ratio, or O/FC ratio. The O/FC ratio is herein defined as the ratio of the number of moles of oxygen (as $O_2$) to the number of moles of combustible carbon. In counting moles of combustible carbon, oxygenates are counted, as long as the carbon atom in question can be further oxidized. Pursuant to this definition, methane counts as one carbon, ethane as two, CO as one, and $CO_2$ counts as zero combustible carbon. For staged-$O_2$ CPO to be effectively carried out, the O/FC ratio at all stages should be greater than about 0.05; preferably, the O/FC ratio should be greater than about 0.10. For the reaction:

$$CH_4 + \tfrac{1}{2}O_2 \rightarrow 2H_2 + CO$$

the stoichiometric ratio for an idealized feed of pure methane and pure oxygen would be 0.5; if the addition of oxygen were staged so that the ratio was 0.25 in each stage, two stages would be required (barring undesirable reactions/reaction products). Partial oxidation for syngas generation will have a preferred overall feed stoichiometry (for the process as a whole as well as for a conventional or co-fed process) in the range of 0.3 to 0.8, preferably 0.4 to 0.8, more preferably 0.4 to 0.7 oxygen molecules per carbon atom of hydrocarbon feed (based on calculated values excluding any carbon atoms bound to oxygen, as well as pursuant to the definition of O/FC defined herein). However, as disclosed hereinabove, the ratio is also dependent on achieving acceptable levels of mixing by utilization of the momentum-accompanying the oxygen stream. In a staged oxygen feed process, it is not necessary to introduce equal amounts of the oxygen-containing feedstream into each stage; whether based on the amount of oxygen per se or the O/FC ratio for each stage, using the measured concentration of fuel carbon present in that stage. In the practice of the present invention, the O/FC ratio for each stage will be less than about 0.50 in all stages, more preferably less than about 0.40, most preferably less than about 0.30. Furthermore, in the practice of the present invention, the O/FC ratio for each stage will be greater than about 0.05. In summary, from about 0.05 to about 0.50; preferably from about 0.05 to about 0.40; most preferably from about 0.10 to about 0.30. Correspondingly, the operation of a multistage process of this invention, particularly when conducted to obtain high product yield (indicative of achieving high selectivity at high conversion), will be carried out in from about 2 to about 12 stages; preferably from about 2 to about 8 stages; most preferably from about 2 to about 5 stages (in each instance, inclusive of the number of stages recited).

Fuel Cell Reformer Process

A liquid hydrocarbon can be used in a hydrogen-based fuel cell system as the hydrogen source provided that the liquid hydrocarbon is converted to hydrogen in a fuel cell reformer. While the reactions carried out in a reformer involve catalytic partial oxidation and are similar to syngas CPO as described above, there are several important differences. The feedstream in a fuel cell reformer almost always contains steam in addition to one or more hydrocarbons and oxygen from an oxygen-containing feedstream. Furthermore, the steam/carbon ratio can be quite large, for example, greater than 2:1. In addition, the feedstreams are also different in that the oxygen source is almost always air and not substantially pure oxygen (although where operating conditions are suitable, substantially pure oxygen can be used and may be advantageous). Additionally, in many of the systems currently being investigated, the hydrocarbon feedstream is typically not primarily methane, but a mixture of higher hydrocarbons such as gasoline. Most importantly, as described above, the desired product is not syngas, but rather a mixture of $H_2/CO/CO_2/H_2O$ wherein the hydrogen content is maximized and the CO content is minimized. To achieve this result, the catalyst used in the fuel cell reformer (whether in one or in multiple stages) should be capable of performing (1) catalytic partial oxidation, (2) steam reforming and (3) the water-gas shift reaction in order to produce a gas mixture as close to thermodynamic equilibrium as possible. These reactions are illustrated, using iso-octane as the hydrocarbon, as follows:

(1) $C_8H_{18} + 4O_2 \rightarrow 8CO + H_2$
(2) $C_8H_{18} + 8H_2O \rightarrow 8CO + 17H_2$
(3) $H_2O + CO \rightarrow CO_2 + H_2$ Generally, the fuel employed in fuel cell reformer processes, including CPO, is selected from the group consisting of gasoline or similar naphtha boiling range hydrocarbons, alcohols such as methanol and/or ethanol, diesel fuel, methane, liquefied petroleum gas (LPG), jet fuel, kerosene, natural gas and mixtures thereof.

The oxygen-containing stream is typically air, but can be substantially pure oxygen or a combination of air and oxygen. The feedstreams are present at a oxygen atom/carbon atom ratio of from about 0.5 to about 1.2; preferably from about 0.65 to about 0.9. As noted earlier, steam is typically present in the feedstream and, when present, the steam/carbon ratio is from greater than zero to about 6:1; preferably from about 1:1 to about 3:1.

As noted above with regard to syngas processes, the reactants here are well mixed and the resultant mixture is preferably preheated before contacting the catalyst. However, it should be noted that, while the hydrocarbon can be liquid when mixed with the oxygen-containing stream, the mixed feedstream to the catalyst should be a gas. The well-mixed reactants are typically preheated to from about 200 to about 900° C.; preferably from about 500 to about 800° C. The fuel cell reformer process of the present invention also is not limited by the pressure employed in the process and may be operated at any suitable pressure, including from about one atmosphere (0.1 MPa) and higher (reference should be made to the discussion hereinabove regarding pressures suitable for operation of the present invention in a syngas process).

The gas hourly space velocity (GHSV) of the feed is high, but generally it is not as high as in a syngas process. Rates typically are from about 1,000 to about 1,000,000; preferably from about 5,000 to about 250,000; more preferably from about 10,000 to about 150,000 $hr^{-1}$.

Other Oxidation Processes

Those skilled in the art will recognize that the advance described herein can be applied in processes for the oxidation of other, commercially valuable, compounds. For example, the invention can also be applied to the catalytic oxidation of ammonia. Significantly, ammonia oxidation is used for the production of nitric acid, which finds use in many other commercial applications, e.g., fertilizer production. Furthermore, the invention can be applied to processes for the catalytic oxidation ethylene. Ethylene oxide is used, e.g., to produce ethylene glycol via hydrolysis, the latter finding significant use in antifreeze and as a monomer for producing polyesters.

Further Processing

The partial oxidation products generated in the instant syngas processes can be recovered and utilized in further synthesis processing, such as Fischer Tropsch synthesis, methanol synthesis, hydrocarbonylation, polymerization, water-gas shift, hydrogen separation, etc. As noted previously, the hydrogen product from the fuel cell reformer can be utilized for the production of energy in a fuel cell. According to a further embodiment of the present invention, the syngas product is cooled, recovered and treated for use in further synthesis processing. Such treatment may include purification to remove low amounts of ammonia and hydrogen cyanide that may be produced in the partial oxidation process. Suitable processes for removing ammonia and hydrogen cyanide from gaseous streams are well known in the art. The removal of ammonia and hydrogen cyanide may be effected in a single step or in a plurality of steps. The cooling steps may be effected before or after the purification treatment steps, as appropriate to accommodate preferred temperatures of the treatment process. Small amounts of hydrogen may be separated from the syngas for use in a hydrocarbon upgrading process.

The treated syngas may be used, e.g., in processes that produce methanol and methanol based products, hydrocarbon synthesis (HCS) products such as liquid hydrocarbons, olefins, alcohols and aldehydes, oxo-synthesis products, ammonia and ammonia based fertilizers and chemicals, town gas and reduction gas used for the production of sponge iron, etc.

In a conventional HCS process, liquid and gaseous hydrocarbon products are formed by contacting the syngas, comprising a mixture of $H_2$ and CO, with a suitable Fischer-Tropsch type HCS catalyst, under shifting or non-shifting conditions. Suitable Fischer-Tropsch catalysts comprise one or more Group VIII catalytic metals such as Fe, Ni, Co, Ru, and Re. In one embodiment, the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for cobalt-containing catalysts comprise titania, particularly when employing a slurry HCS process in which higher molecular weight, e.g., $C_{10+}$ products, primarily paraffinic liquid hydrocarbon products, are desired.

The hydrocarbon products produced by an HCS process according to an embodiment of the present invention are typically upgraded to form suitable products such as, synthetic crude oil, liquid fuels (e.g., jet and diesel), lubricating industrial or medicinal oil, waxy hydrocarbons, olefins (by, e.g., catalytic cracking or steam cracking), etc. Details of these processes are well known to those skilled in the art and need not be described here. All or a portion of the HCS products can be fractionated and then converted in one or more steps with or without a suitable catalyst or in the presence of hydrogen or both. Hydroconversion is usually preferred and includes mild hydrotreating (resulting in minimal branching) to make pumpable liquids, hydroisomerization (somewhat more branching, e.g., 25 to 85% and, preferably mono-methyl branching) for making distillates such as jet fuels and diesel fuels, and more severe hydroisomerization (where virtually all, e.g., less than 10 wt. % and preferably less than 5 wt. % of the feed remains unconverted) to make lube oils. These processes are also well known and reported in the literature in so far as catalysts and reaction conditions are concerned.

The ranges and limitations provided in this specification and claims are those that are believed to particularly point out and distinctly claim the instant invention. However, it is understood that other ranges and limitations that perform substantially the same function in substantially the same way to obtain the same or substantially the same result are intended to be within the scope of the instant invention as defined by this specification and claims.

The process of the present invention is further described by way of the following illustrative examples which are not intended to limit the scope of the invention in any manner whatsoever.

EXAMPLES (A) Preparation of Catalyst Powder 120 g of gamma alumina pre-calcined to 500° C. for 4 hours with a BET surface area of 212 $m^2/g$ was impregnated with a solution consisting of 8.77 g $La(NO_3)_3$ (MW=324.93 g/mol); 2.38 g $Ba(NO_3)_2$ (MW=261.33 g/mol); and 88.57g de-ionized (DI) water. Prior to impregnation, the impregnating solution was heated to approximately 70° C. After impregnation, the resulting catalyst was dried at 120° C. for 1 hour followed by calcination up to 1200° C. according to the following procedure:

(a) heat from 120–500° C. ramp @ 5° C./min.;
(b) hold @ 500° C. for 1.5 hours;
(c) cool from 500–120° C. @ 10° C./min.;
(d) heat from 120–1000° C. ramp @ 20° C./min.;
(e) heat from 1000–1200° C. ramp @ 5° C./min.;
(f) hold @ 1200° C. for 4 hours;
(g) cool from 1200–120° C. @ 20° C./min.; The resulting powder contained 2.40 wt. % La and 0.91 wt. % Ba by atomic absorption analysis.

20 g of the resulting La/Ba stabilized alumina was then impregnated with 21.36 g of a 9.94 wt. % Rh aqueous Rh nitrate solution. This impregnation was carried out in two steps using 10.68 g of solution per step. After each step, the resulting powder was calcined according to the following procedure:

(a) heat for 2 hours @ 120° C.;
(b) heat from 120–600° C. ramp @ 10° C./min.;
(c) hold for 2 hours at 600° C.;

(d) cool from 600–120° C. @ 10° C./min. The resulting powder contained 9.51 wt. % Rh by atomic absorption analysis.

(B) Preparation of Catalyst Slip

The catalyst powder described above was further treated to form a catalyst slip as follows. 17 g of catalyst powder were mixed with 0.85 g of acetic acid, 8.94 g of alumina binder solution, 10% alumina by weight (Nalco 8676 brand), 2 drops of octanol, and 31.4 g of DI water. The slip was ball milled overnight.

(C) Preparation of Catalyst R

A portion of the catalyst slip described above was diluted with DI water to achieve 14.9 wt. % solids. The resulting diluted slip was used to apply a coating of catalyst washcoat to a 0.75 inch (1.905 cm) diameter×0.5 inch (1.27 cm) long alumina foam body identified as containing 65 pores per inch (ppi) (manufactured by Hi-Tech Ceramics, Inc., Alfred N.Y.). After washcoating, the sample was dried at 120 °C. and calcined according to the following procedure:

(a) heat from 120–600° C. ramp @ 10° C./min.;

(b) hold for 2 hours at 600° C.;

(c) cool from 600–120° C. @ 10° C./min. The resulting catalyst contained a washcoat loading of 0.24 g/in$^3$ (0.0146 g/cm$^3$). For the purposes of this invention, catalyst R was used as a reference or comparative catalyst.

(D) Preparation of Catalyst E

A portion of the catalyst slip described above was diluted with DI water to achieve 9.1 wt. % solids. The resulting diluted slip was used to apply a catalyst washcoat to a 0.75 inch (1.905 cm) diameter×0.5 inch (1.27 cm) long alumina foam body identified as containing 65 pores per inch (ppi) (Dycat brand manufactured by Dytech Corporation Limited, Sheffield, Great Britain). After washcoating, the sample was calcined according to the following procedure:

(a) heat for 2 hours @ 120° C.;

(b) heat from 120–600° C. ramp @ 10° C./min.;

(c) hold for 2 hours at 600° C.;

(d) cool from 600–120° C. @ 10° C./min. The resulting catalyst contained a washcoat loading of 0.24 g/in$^3$ (0.0146 g/cm$^3$). Catalyst E is representative of a catalyst of the present invention.

EXAMPLE 1

Catalyst R and Catalyst E were tested in a process for the catalytic partial oxidation of methane under the same conditions: the gas flow rate, expressed as gaseous hourly space velocity (GHSV, calculated as the flow rate of gases at "standard" temperature and pressure, i.e., 1 atm/101.3 kPa and 68° F./20° C., divided by the total volume of the catalyst) in all runs was=144,207/hr; pressure was 3.8–7.4 psig (0.126–0.150 MPa) and other conditions as noted in the table. All carbon balances closed between 98.9–99.8% (No other significant products were observed, i.e., none were present in amounts greater than 0.1 wt. %). A quartz reactor enclosed in a furnace was used to contain the catalyst. The furnace was used to control catalyst inlet temperature and minimize heat loss from the catalyst bed. Product gases, CO, $CO_2$, $H_2$, $C_2H_2$, $C_2H_4$, $C_2H_6$, were quantified by GC (there was no detectable $O_2$ in the product stream).

The table below shows the conversions and selectivities achieved with the two catalysts under a variety of conditions.

TABLE 1

| $CH_4/O_2$ Feed Ratio | Inlet Temp (° C.) | Conversion (%) | | Normalized Conversion (%) | | $H_2$ Selectivity (%) | | CO Selectivity (%) | |
|---|---|---|---|---|---|---|---|---|---|
| | | Catalyst E | Catalyst R | Catalyst E | Catalyst R | Catalyst E | Catalyst R | Catalyst E | Catalyst R |
| 2 | 350 | 93.0 | 91.0 | 93.0 | 91.0 | 96.2 | 95.7 | 97.4 | 96.6 |
| 2 | 500 | 96.0 | 93.3 | 96.0 | 93.3 | 97.3 | 96.5 | 98.6 | 97.7 |
| 2 | 600 | 97.4 | 93.7 | 97.4 | 93.7 | 97.9 | 96.5 | 99.1 | 96.5 |
| 3 | 500 | 65.3 | 61.7 | 97.8 | 92.5 | 98.5 | 95.8 | 98.1 | 97.3 |
| 3 | 670 | 66.9 | 64.6 | 100.2 | 96.8 | 99.2 | 97.8 | 99.2 | 98.4 |
| 4.1 | 670 | 49.8 | 47.9 | 99.8 | 96.0 | 99.0 | 97.7 | 98.7 | 98.0 |
| 6.1 | 670 | 32.4 | 30.3 | 98.4 | 92.1 | 99.4 | 97.0 | 98.1 | 97.4 |
| 8.1 | 670 | 24.0 | 21.7 | 98.4 | 88.6 | 99.5 | 95.6 | 97.6 | 96.8 |
| 10.2 | 670 | 19.0 | 16.7 | 97.7 | 85.3 | 99.4 | 93.6 | 97.2 | 96.1 |

Normalized conversion (for methane/oxygen feed ratios greater than 2) = % conversion × $[(CH_4/O_2)/2]$
% CO Selectivity = (CO out − CO in) × $100/(CH_4$ in − $CH_4$ out)
% $H_2$ Selectivity = ½($H_2$ out − $H_2$ in) × $100/(CH_4$ in − $CH_4$ out)

This example shows that catalyst E, the catalyst of the invention, exhibits consistently higher conversion levels. Since both catalysts were prepared in substantially the same way and contained the same amount of washcoat and Rh per unit reactor volume, and thus the same number of active sites per unit reactor volume, the distribution of these sites differed as a result of the differences in the underlying carrier structure (i.e., the structure for Catalyst E was more uniform). Furthermore, both hydrogen and carbon monoxide selectivities are consistently higher for the catalyst of the invention. Conversely, carbon dioxide and water, products of complete combustion are favored with the catalyst prepared using the less uniform ceramic foam monolith.

EXAMPLE 2

Scanning Electron Microscopy (SEM)

Figure 1B:
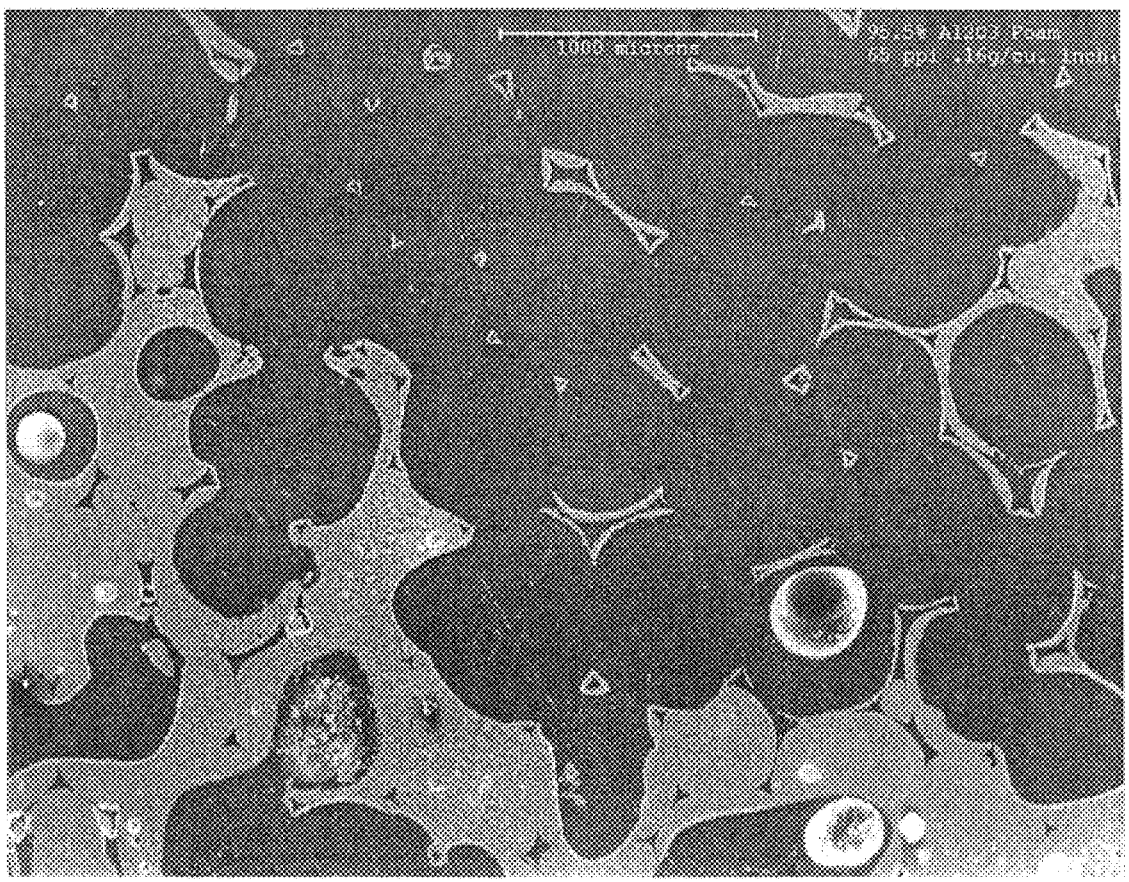

SEM was used to investigate the microstructure and uniformity of ceramic foams representative of those used to prepare Catalyst R and Catalyst E. Representative results are shown in FIGS. 1a and 1b. Each of these ceramic foam samples are identified as 65 ppi materials, but the sample of FIG. 1b is macroscopically more uniform. In addition, it contains very few of the smallest pore sizes, e.g., about 10 to about 40 microns (this is believed to result from a difference in the methods used to prepare the two materials).

The non-uniform sample of FIG. 1a also has an undesirable density gradient (for purposes of the present invention) having more foam material near the edges of the sample and an undesirable (also with regard to the present invention) low density of foam in the center of the sample. This is also believed to result from the method used to prepare the foam that is believed to involve a dip coating of alumina slip on an organic foam body. Such a non-uniform macro-pore size distribution leads to preferential channeling of gas flow through the center of the sample where catalyst content is low due to low surface area of monolith available as carrier structure. On the other hand, the ceramic foam sample shown in FIG. 1b has a much narrower pore size distribution, and it does not exhibit a radial non-uniformity. This results in a preferred and more uniform distribution of active catalyst sites and minimizes undesirable channeling of gas flow. Gas phase chemistry can occur where Rh catalyst site density is low and pore sizes are excessively large.

EXAMPLE 3
X-Ray Microtomography (XMT)

In this example, X-ray microtomography was carried out on a catalyst sample similar to catalyst R, (the ceramic foam carrier starting material was obtained from the same source as that used for catalyst R, Hi-Tech Ceramics, Inc.) with the following differences:

(a) 45 vs. 65 ppi;
(b) washcoat loading=0.34 g/in.$^3$ (0.0207 g/cm$^3$) vs. 0.24 g/in$^3$ (0.0146 g/cm$^3$); and
(c) sample size=0.5 in. diameter×0.5 in. long (1.27 cm.× 1.27 cm.) vs. 0.75 inch (1.905 cm) diameter×0.5 inch (1.27 cm) long The density distribution of the ceramic foam carrier was measured at an x-ray energy of 23.3 keV. The concentration distribution of Rh was measured by subtracting the projections acquired at 23.3 keV (below the Rh K absorption edge) from projections acquired at 23.4 keV (above the Rh K absorption edge) and reconstructing the difference signal. The spatial resolution of the resulting 512×512×360 3D images is 11.54 microns/pixel. The lower limit of determination for Rh is about 1 wt. %, well below the concentration of Rh in this sample's washcoat. Qualitatively, 3D images of the 45 ppi foam showed greater foam density on the exterior of the monolith. This result is similar to that observed by SEM on the catalyst R, 65 ppi foam carrier described in Example 2. However, unlike SEM, which only samples exposed surfaces, the XMT method samples the specimen volume and thus can detect Rh deposited on interior surfaces, in small pores. For the sample tested in this example, 68% of the detected Rh was found to reside in washcoat contained in the pores that were difficultly accessible to process streams and/or "dead-ended" pores. These pores are generally very thin and are connected to the exterior through one or more small openings. The Rh in these pores is underutilized in a reaction such a catalytic partial oxidation, because most of the gas flow will channel through the larger monolith pores. Therefore a more spatially uniform pore distribution containing the catalytically active metal would be expected to exhibit improved performance.

Figure 2:
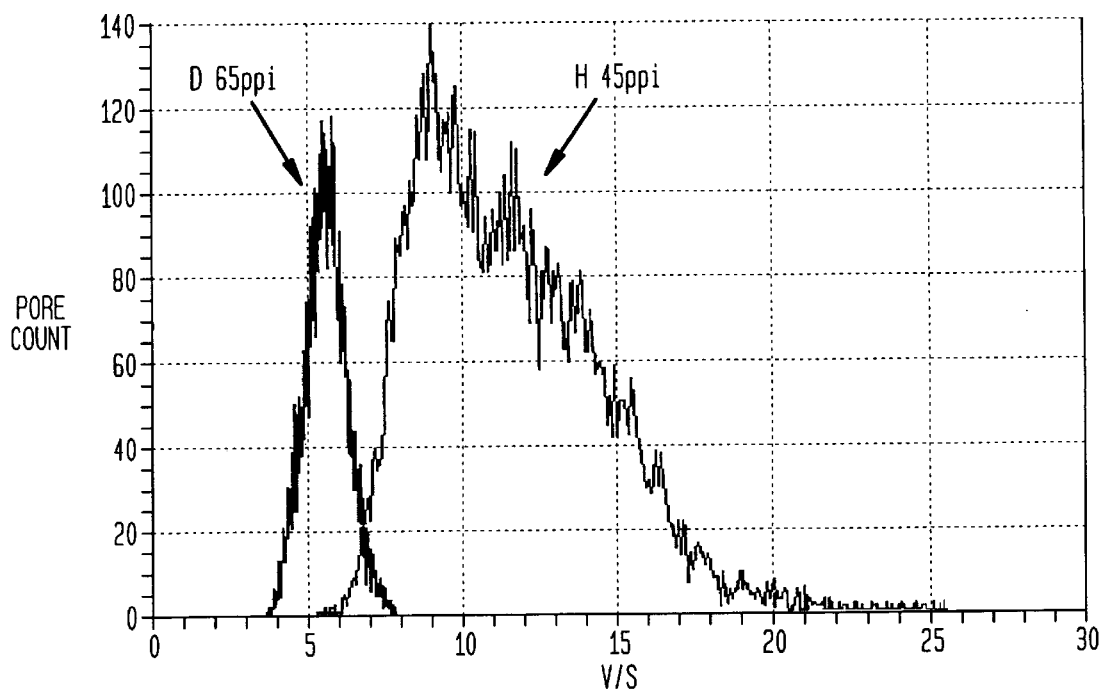
FIG. 2 illustrates the distribution of pores in different substrates having narrow and broad pore size distributions.

FIG. 2 shows the pore size distribution (represented by V/S) obtained using microtomography of catalyst supports from two different sources: Hi-Tech brand (identified as H in the figure; nominally designated as having 45 ppi) and Dycat brand (identified as D in the figure; nominally designated as having 65 ppi). The pore size distribution is obtained by dividing the three dimensional microtomographic image into a large number of identically sized, randomly located sub-volume elements. In each sub-volume element the total pore volume V and surface area S are measured. Assuming that the pores are spherical, the pore radius R is given by V/S=R/3. The number of pores is plotted for each V/S. The narrow peak in the D support indicates a narrow distribution of pore sizes, while the broad peak for the H support shows a broad distribution of pore sizes.

Figure 3:
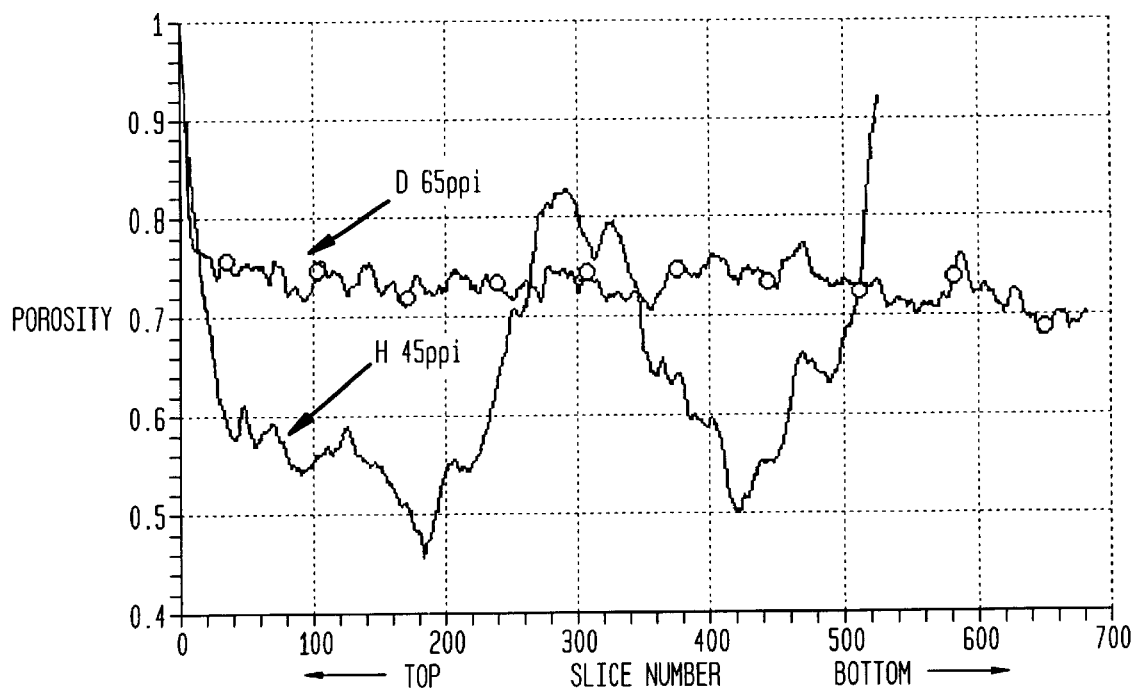
FIG. 3 illustrates the distribution of porosity throughout a uniform carrier and a non-uniform carrier.

FIG. 3 shows the porosity of each microtomographic slice in the three dimensional D and H catalyst supports. The porosity is calculated in each two dimensional slice as described earlier. For the three dimensional results presented in this Figure, low numbered slices are near the top exterior surface of the sample. The data for the D sample show a uniform porosity throughout the support while the H sample has a non-uniform porosity distribution.

Other evidence obtained using such supports confirms that in a support having uniform microarchitectural features as described herein, it is less likely that a high proportion of the catalytic metal, e.g. Rh, will be present in the small pores of the support, which small pores are less accessible to the reacting streams.

EXAMPLE 4
Effect of a Washcoat

A Rh metal coating was applied directly (using Rh nitrate solution in the absence of a washcoat) to a 0.75 inch (1.905 cm) diameter×0.5 inch (1.27 cm) long alumina foam body identified as Dycat brand 300 micron (nominally 65 ppi, manufactured by Dytech Corporation Limited, Sheffield, Great Britain) alumina foam carrier to obtain a Rh loading of 1.3 wt. % based on the total weight of the Rh plus alumina foam. This is referred to as sample "A".

A washcoated sample was prepared using procedures similar to those described for preparing the catalyst samples of Example 1. The composition of the catalyst washcoat was 5 wt. % Rh, 3 wt. % La, 1 wt. % Ba, on Al$_2$O$_3$; it was supported on the same foam carrier as for sample A. The washcoat loading on the carrier foam was 0.33 g/in$^3$. The Rh loading based on total weight of Rh plus washcoat plus alumina foam was 0.128 wt. %. This is referred to as sample B.

Samples A and B were tested in a CPO reactor to compare their activities and selectivities. Results are given in Table 2 below. For these tests, pressure varied from 4.5 to 7.8 psig (0.131–0.153 MPa); carbon balances closed between 99.0–99.7%; the gaseous hourly space velocity was 144,207/hr and the CH$_4$/O$_2$ ratio was 2.0.

TABLE 2

| Inlet Temp., ° C. | 350° C. | | 500° C. | | 605° C. | |
|---|---|---|---|---|---|---|
| Catalyst | A | B | A | B | A | B |
| Performance* | | | | | | |
| Conversion | 86.5 | 93.0 | 88.9 | 95.8 | 91.0 | 97.2 |
| H$_2$ Selectivity | 92.6 | 96.4 | 93.8 | 97.3 | 94.8 | 97.7 |
| CO Selectivity | 97.2 | 97.4 | 97.8 | 98.5 | 98.1 | 99.0 |

*Performance criteria as defined in Table 1

These data demonstrate that use of a washcoat results in superior catalyst activity and selectivity. Additionally, when the catalyst metal is present in the washcoat that is applied to the carrier of the present invention, lower metal concentrations can be used than where the catalyst metal is applied directly to the carrier. Sample A, which did not employ a washcoat, contained approximately ten times the Rh content as sample B, yet sample B performed better than sample A in the CPO test.

EXAMPLE 5
Effect of Washcoat Loading

Three samples with different washcoat loadings were prepared using samples of the same carrier and procedures similar to those described for preparing the catalyst samples of Example 4. The washcoat composition of each of the catalysts was 5 wt. % Rh, 1 wt. % S, 3 wt. % La, 1 wt. % Ba, on Al$_2$O$_3$; it was supported on samples of the same foam carrier as for sample A. Washcoat loadings (g/in$^3$) were as follows: sample C=0.23; sample D=0.66; and sample F=2.16. Samples C, D and F were tested in a CPO reactor to compare their activities and selectivities. Results are given in Table 3 below. For these tests, pressure varied from 7.4 to 8.3 psig (0.150–0.156 MPa); carbon balances closed between 99.9–100.2%; the gaseous hourly space velocity was 144,207/hr and the $CH_4/O_2$ ratio was 2.0.

TABLE 3

| Inlet Temp., °C. | 300° C. | | | 400° C. | | | 500° C. | | | 600° C. | | |
|---|---|---|---|---|---|---|---|---|---|---|---|---|
| Catalyst | C | D | F | C | D | F | C | D | F | C | D | F |
| Washcoat Loading (g/in³) | 0.23 | 0.66 | 2.16 | 0.23 | 0.66 | 2.16 | 0.23 | 0.66 | 2.16 | 0.23 | 0.66 | 2.16 |
| Performance* | | | | | | | | | | | | |
| Conversion | 90.5 | 90.6 | 90.4 | 92.3 | 92.4 | 92.5 | 94.1 | 94.6 | 94.5 | 95.9 | 96.3 | 96.2 |
| $H_2$ Selectivity | 95.8 | 95.8 | 96.0 | 96.6 | 96.5 | 96.7 | 97.3 | 97.4 | 97.4 | 97.8 | 97.9 | 97.9 |
| CO Selectivity | 96.6 | 96.8 | 96.3 | 97.3 | 97.5 | 97.3 | 98.0 | 98.4 | 98.1 | 98.7 | 99.0 | 98.8 |

*Performance criteria as defined in Table 1

Within experimental error, catalysts C, D, and F performed equivalently under CPO test conditions. Thus for application in a CPO process, the catalysts of the present invention can be used over a wide range of washcoat loadings.

EXAMPLE 6
Effect of Rh Concentration in the Washcoat

Five samples, G, B, H, E, and I, containing different Rh concentrations were prepared using samples of the same carrier and procedures similar to those described for preparing the catalyst samples of Examples 1 and 4. Samples B and E correspond to the samples reported above. The powder used to prepare the washcoat composition of each of the catalysts was the same in each case: 3 wt. % La, 1 wt. % Ba, on $Al_2O_3$. For each sample, the powder was impregnated with an aqueous Rh nitrate solution to give the desired Rh content in the resulting powder. The powders were then used to prepare washcoat slips that were applied to samples of the same foam carrier as in Examples 1, 4, and 5. Rh concentrations in the resulting washcoats were as follows: sample G=2.5; sample B=5.0; sample H=7.5; sample E=9.5; and sample I=15. Washcoat loadings were 0.33, 0.33, 0.31, 0.24 and 0.35 g/in³ (0.0200, 0.0200, 0.0189, 0.0146, and 0.0213 g/cm³) for samples G, B, H, E, and I, respectively. All samples were tested in a CPO reactor to compare their activities and selectivities. Results are given in Table 4 below. For this series of tests, pressure varied from 6.8 to 7.5 psig (0.146–0.151 MPa); carbon balances closed between 99.8–100.1%; the gaseous hourly space velocity was 144,207/hr and the $CH_4/O_2$ ratio was 2.0.

The activities and selectivities of the samples containing more than 2.5 wt. % Rh in the washcoat were superior to those of catalyst G (at 2.5 wt. % Rh). This suggests that where Rh is used as the catalytic metal in a washcoat applied to the carrier of the present invention for use in a CPO process, a concentration of greater than about 2.5 wt. % Rh is preferred. The data further suggest that a Rh concentration as high as 15. wt. % did not provide a significant advantage over the lower concentrations and there may have been at a slight performance disadvantage based on this particular experiment. Since using a higher concentration of Rh is more expensive, an economic analysis should be used to determine whether an increase in performance at a higher Rh content is justified in the process under consideration; such an analysis is readily within the ability of those skilled in the art.

EXAMPLE 7
Fuel Cell Reformer Applications

Reactions were conducted under steady-state conditions as follows:

| Fuel: | iso-octane |
|---|---|
| Fuel feed rate: | 1 ml/min (= 0.0061 mol/min = 148 ml/min gas at 25° C.) |
| Steam/Carbon Ratio: | 1.0 (= 0.0486 mol/min = 1.191/min gas at 25° C.) |
| Oxygen/Carbon Ratio: | 0.9 (= 0.0219 mol/min $O_2$ = 0.1043 mol/min air = 2.551 1/min at 25° C.) |
| Catalyst volume: | 0.5 in diameter × 1 in length = 3.22 cm³ |
| GHSV | 7.2 × 10⁴/hr |

Catalyst was prepared as follows:
A. Preparation of Catalyst Powder (10% Rh/3% La/1% Ba/$Al_2O_3$; all percentages by weight)

240 g of gamma alumina pre-calcined to 500° C. for 4 hr. with a BET surface area of 212 m2/g was impregnated wit

TABLE 4

| Inlet Temp., °C. | 500° C. | | | | | 600° C. | | | | |
|---|---|---|---|---|---|---|---|---|---|---|
| Catalyst | G | B | H | E | I | G | B | H | E | I |
| Rh conc. (wt. %) | 2.5 | 5.0 | 7.5 | 9.5 | 15. | 2.5 | 5.0 | 7.5 | 9.5 | 15. |
| Performance* | | | | | | | | | | |
| Conversion | 91.3 | 95.8 | 95.4 | 96.0 | 94.6 | 93.5 | 97.2 | 96.9 | 97.4 | 96.3 |
| $H_2$ Selectivity | 96.1 | 97.3 | 97.4 | 97.3 | 97.4 | 96.9 | 97.7 | 97.9 | 97.9 | 98.0 |
| CO Selectivity | 97.2 | 98.5 | 98.4 | 98.6 | 97.4 | 97.9 | 99.0 | 99.0 | 99.1 | 98.0 |

*Performance criteria as defined in Table 1 a solution consisting of 17.54 g La(NO$_3$)$_3$ (MW=324.93 g/mol); 4.76 g Ba(NO$_3$)$_2$ (MW=261.33 g/mol); and 177.14 g DI water. Prior to impregnation, the impregnating solution was heated to approximately 65° C. After impregnation, the resulting catalyst was dried at 120° C. for 1 hr. followed by calcination up to 1200° C. following the procedure given below.

(a) heat from 120–500° C. ramp @ 5° C./min.;
(b) hold @ 500° C. for 1.5 hours;
(c) cool from 500–120° C. @ 10° C./min.;
(d) heat from 120–1000° C. ramp @ 20° C./min.;
(e) heat from 1000–1200° C. ramp @ 5° C./min.;
(f) hold @ 1200° C. for 4 hours;
(g) cool from 1200–120° C. @ 20° C./min.

30 g of the resulting La/Ba stabilized alumina was then impregnated with a solution consisting of 33.3 g of a 10.03 wt. % aqueous Rh nitrate solution plus 4.86 g of DI water. This impregnation was carried out in three steps. After each step, the resulting powder was dried. After the final step, the resulting powder was calcined as shown below.

(a) heat for 2 hours @ 120° C.;
(b) heat from 120–600° C. ramp @ 10° C./min.;
(c) hold for 2 hours at 600° C.;
(d) cool from 600–120° C. @ 10° C./min.

The resulting powder contained approximately 10% Rh, 3% La and 1% Ba.

B. Preparation of Catalyst Slip (10% Rh/3% La/1% Ba/Al$_2$O$_3$; all percentages by weight).

The catalyst powder described in Section A immediately above was further treated to form a catalyst slip. 25 g of catalyst powder were mixed with 1.25 g of acetic acid, 12.49 g of Nalco 8676 brand alumina binder solution (10% alumina by weight), 5 drops of octanol, and 46.18 g of DI water. This slip solution was ballmilled for 6 hours.

C. Preparation of Washcoated Foam (10% Rh/3% La/1% Ba/Al$_2$O$_3$; 65 ppi Dycat brand alumina foam; all percentages by weight). A portion of the catalyst slip described in section B immediately above was used to apply a single coating of catalyst washcoat to a 0.50 inch (1.27 cm) diameter by 1.0 inch (2.54 cm) long Dycat brand 300 micron (nominally 65 ppi) alpha alumina foam body. After washcoating, the sample was dried at 120° C. and then calcined according to the following procedure.

(a) heat from 120–600° C. ramp @ 10° C./min.;
(b) hold for 2 hours at 600° C.;
(c) cool from 600–120° C. @ 10° C./min.

The resulting catalyst had a washcoat loading of 0.31 g/in$^3$ (0.0189 g/cm$^3$).

The experiment was conducted in a quartz tube reactor of approximately 0.5 in (1.27 cm) inner diameter placed in a furnace. The first 6 in (15.24 cm) of the tube were empty and it was in this region that the gases were preheated to the desired temperature. The temperature was measured at a point approximately 0.5 in (1.27 cm) above the catalyst surface; the latter was shielded by a 0.5 in (1.27 cm) height uncatalyzed foam monolith which served as a heat and radiation shield. The exhaust temperature was measured at a point 1–2 mm downstream from where the exhaust exited the catalyst. Fuel and water were vaporized in separate vaporizers and the resultant gases were mixed with air at approximately 150° C. The gases were well mixed and introduced into the reactor where they were heated to 550–700° C. before contacting the catalyst. All reactions were performed at steady-state with approximately 30 hours of total reaction time on the catalyst. No deactivation of the catalyst was observed during this interval. The results are reported in the following table:

| Exit Gas Composition[1] (As % of Total Gas Mixture) | | |
|---|---|---|
| | Preheat Temperature (° C.) | |
| Gas Component | 550 | 700 |
| H$_2$ | 49.5 | 48.7 |
| CO | 23.5 | 24.6 |
| CO$_2$ | 7.8 | 7.2 |
| H$_2$O | 18.2 | 19.5 |
| CH$_4$ | 1.0 | 0.06 |
| Exit Temp., ° C. | 707 | 770 |

(1) Excluding nitrogen and argon

The catalyst is effective at:
(a) partially oxidizing the iso-octane, as there is no exit oxygen;
(b) steam reforming, as the feed contains 10% less oxygen than would be required to partially oxidize all of the iso-octane (i.e., the O/C ratio is 0.9); and (c) effecting a significant amount of water-gas shift, which is evident at 550° C. preheat, where 24% of the carbon in the feed is converted to product CO$_2$, and at 700° C. preheat, where 22.4% of the carbon in the feed is converted to product CO$_2$. The shift in product composition with a change in preheat temperature from 550° C. to 700 ° C., i.e., less methane, more CO versus CO$_2$, is consistent with the result based on thermodynamic equilibrium. Additionally, the final gas mixture compositions are quite close to the equilibrium values for a mixture of H$_2$/CO/CO$_2$/H$_2$O at the observed exhaust temperature.

What is claimed is:

1. A process for the partial catalytic oxidation of a hydrocarbon containing feed comprising contacting said feed with an oxygen-containing gas in the presence of a catalyst in a reaction zone, wherein:
   (a) said catalyst comprises at least one catalytically active metal selected from the group consisting of silver and the elements of Group VIII of the Periodic Table of the Elements supported on a porous ceramic carrier;
   (b) said catalyst is retained within said reaction zone in a fixed arrangement; and
   (c) said carrier has a distribution of total pores wherein:
      (1) about 70 percent of said total pores have a volume to surface area ratio (V/S) that is within about 20 percent of a mean V/S value for said total pores and no pores have a volume to surface area ratio that is greater than twice the mean V/S value for said total pores; and
      (2) about 70 percent of said total pores have a pore-to-pore distance between neighboring pores that is within about 25 percent of a mean pore-to-pore distance between neighboring pores; and
      (3) about 50 percent of said total pores have a coordination number that is within about 50 percent of a mean coordination number between neighboring pores and wherein less than about 15 percent of said total pores have a coordination number that is less than 3.

2. The process according to claim 1, wherein about 80 percent of said total pores have V/S values that are within about 20 percent of the mean V/S value for said total pores.

3. The process according to claim 1, wherein about 90 percent of said total pores have V/S values that are within about 10 percent of the mean V/S value for said total pores.

4. The process according to any of claims 1–3, wherein for about 80 percent of said total pores, the pore-to-pore distance between neighboring pores is within about 25 percent of the mean pore-to-pore distance between neighboring pores.

5. The process according to any of claims 1–3, wherein for about 90 percent of said total pores, the pore-to-pore distance between neighboring pores is within about 20 percent of the mean pore-to-pore distance between neighboring pores.

6. The process according to any of claims 1–3, wherein about 50 percent of said total pores have a coordination number that is within about 30 percent of the mean coordination number between neighboring pores and wherein less than about 10 percent of said total pores have a coordination number that is less than 3.

7. The process according to claim 1, wherein contacting the hydrocarbon containing feed with the oxygen containing gas in the presence of a catalyst in a reaction zone is a partial oxidation reaction wherein the reaction has an oxygen-to-carbon molar feed ratio in the range of from about 0.45 to about 0.75 and a gas hourly space velocity of the hydrocarbon containing feed in the range of from about 20,000 to about 25,000,000 $hr^{-1}$.

8. The process according to claim 7 characterized in that said hydrocarbon containing feed is selected from the group consisting of methane, natural gas, a source of light hydrocarbons and mixtures thereof.

9. The process according to claim 7 or 8 characterized in that said oxygen-containing gas is substantially pure oxygen.

10. The process according to claim 7 characterized in that said oxygen-to-carbon molar feed ratio is from about 0.45 to about 0.65.

11. The process according to claim 1 characterized in that the feed additionally comprises steam at a steam-to-carbon ratio of from above 0.0 to about 6.0.

12. The process according to claim 11 characterized in that said steam-to-carbon ratio is from about 1.0 to about 3.0.

13. The process according to claim 1 characterized in that said catalytically active metal comprises at least one metal selected from the group consisting of silver, nickel, ruthenium, rhodium, palladium, osmium, iridium and platinum.

14. The process according to claim 9 characterized in that the gas hourly space velocity of the feed is in the range of from 1,000 to 1,000,000 $hr^{-1}$.

15. The process according to claim 10 characterized in that said feed is supplied at a pressure in the range of from about one atmosphere (0.1 MPa) up to about 50 atmospheres (5.0 MPa).

16. The process according to claim 11 characterized in that said catalytic oxidation is a fuel cell reformer reaction, said oxygen-containing gas is selected from the group consisting of air, oxygen and mixtures thereof, and said hydrocarbon containing feed is selected from the group consisting of gasoline, methanol, ethanol, diesel fuel, methane, liquefied petroleum gas, jet fuel, kerosene, natural gas and mixtures thereof.

17. The process according to claim 16 characterized in that the gas hourly space velocity of the feed is in the range of from about 1,000 to about 1,000,000 $hr^{-1}$.

18. The process according to claim 16 characterized in an oxygen atom-to-carbon atom ratio in the range of from about 0.5 to about 1.2.

19. The process according to claim 11 wherein the hydrocarbon containing feed and oxygen-containing gas are heated, prior to contacting said catalyst, to a temperature of from about 200° C. to about 900 ° C.

20. The process according to claim 13 wherein a metal oxide washcoat has been coated on said porous ceramic carrier and said at least one catalytically active metal is supported on or dispersed in said washcoat.

21. The process according to claim 20 further comprising at least one catalyst modifier on said catalyst support.

22. The process according to claim 21 wherein said at least one modifier is selected from the group consisting of sulfur, La, Ba and Pr.

23. The process according to claim 20 wherein said washcoat comprises alumina or a modified alumina.

24. The process according to claim 23 wherein said at least one catalytically active metal is rhodium and the amount of rhodium in said washcoat is from about 2.0 to about 20.0% by weight.

25. The process according to claim 20 wherein the amount of washcoat deposited on said porous ceramic carrier is from about 0.1 to about 2.0 g/in $^3$.

26. The process according to claim 25 wherein said at least one catalytically active metal in said washcoat has an average particle size of less than about 50 nanometers.

27. The process according to any of claims 1–3 wherein said distribution of total pores within said carrier is further characterized as follows: about 70 percent of said total pores have a pore throat area that is within about 50 percent of a mean pore throat area for said total pores.

28. The process according to claim 27 wherein about 70 percent of the total pores have a pore throat area that is within about 30 percent of the mean pore throat area for said total pores.

29. The process according to any of claims 1–3 wherein said carrier is comprised of a monolith or particles.

30. The process of claim 29 wherein the particle size of said particles is from about 200 to about 2,000 microns diameter.

* * * * *